Sept. 29, 1959  D. L. HAMMOND  2,906,844
CONSTANT TEMPERATURE OVEN
Filed April 4, 1957
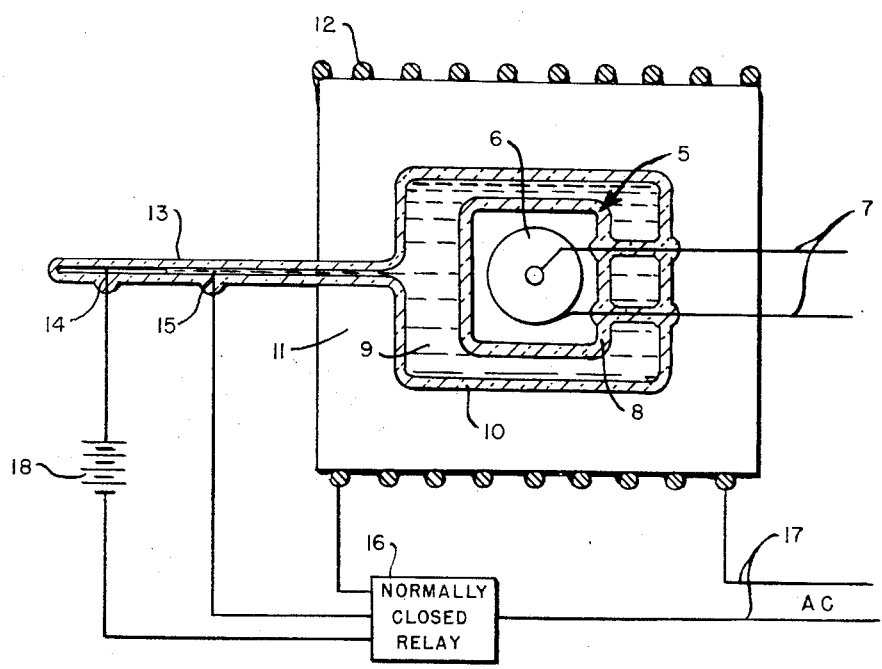
INVENTOR.
DONALD L. HAMMOND
BY
Harry M. Saragovitz
ATTORNEY United States Patent Office 2,906,844
Patented Sept. 29, 1959

2,906,844

CONSTANT TEMPERATURE OVEN

Donald L. Hammond, Estes Park, Colo.

Application April 4, 1957, Serial No. 650,805

2 Claims. (Cl. 219—19)

(Granted under Title 35, U.S. Code (1952), sec. 266)

The invention described herein may be manufactured and used by or for the Government for governmental purposes, without the payment of any royalty thereon.

This invention relates to apparatus for controlling the temperature within an enclosure and particularly to such devices wherein the temperature may be held uniformly to very close limits.

The invention presents a combination of factors, acting together, to provide an efficient and fast acting controlling device. One of these factors is the direct application of heat to the enclosed space or chamber, thereby avoiding time lag present in conventional devices of the nature indicated wherein conduction heating methods are the rule. In the present invention, molecular heating is employed, wherein the energy input element of the heating means is spaced from the heat generating element and the heat generating element is placed in intimate contact with the walls of the chamber.

In the invention, a substantial distance may exist between the heating element, itself in intimate contact with the chamber, and the input element whose function is to transfer energy to the heating element. This substantial physical separation permits the introduction of a thick layer of insulation between the heater elements. Transfer of heat is achieved by induction with the result that the time lag existing in conventional apparatus is eliminated. Obviously, also the insulation is effective in isolating the chamber from the effects of ambient temperature gradients. A highly desirable feature of the invention is its extremely fast acting heat controlling cycle. Such close control is of great benefit in preventing overshoot of temperature during the controlling cycle.

In its broad conception the invention consists of an external coil energized by alternating current whose frequency may be chosen to produce a desired result in a specific use to which the apparatus may be put. Desirably the coil embraces a relatively thick layer of noninductive heat insulating material, such as one of the plastic foam materials or in place of such materials the chamber may be surrounded by an evacuated cell. The chamber or oven containing the device, whose temperature is to be controlled, is situated centrally within the insulation. The chamber or oven is itself surrounded by a heat generating unit which may be composed of a mass of electrically conducting liquid, such as mercury which, in turn, is confined within a vessel, such as a glass container. The mercury may be in actual contact with the walls of the oven or slightly spaced therefrom. The heater element may also be made of a metal in its solid state in which case the heater may form the walls of the oven.

In operation, the electromagnetic field created by the coil heats the mercury by induction and control of the application of such heat to the chamber is obtained by controlling the energy in the coil. A significant aspect of this means of heat control lies in the fact that heat generated in the mercury may be instantly initiated at full intensity and instantly stopped with substantially no out of phase periods of heat transference either when heat is turned on or when it is turned off. The undesirable tendency for overshoot of temperature, which is common in conventional equipment, is thus greatly minimized. This is true in the on-off system of control and hunting or cycling is greatly minimized in that system wherein continuous control is exercised.

A primary object of the invention is to provide a closely controlled temperature regulated compartment.

A further object of the invention is to provide temperature controlling means having a fast acting heat control cycle.

A still further object of the invention is to provide a heat controlling apparatus wherein the heat applying means may be in intimate contact with the object whose temperature is to be controlled.

A further object of the invention is to provide heat control apparatus wherein the temperature of the chamber or oven is prevented from rising above the required temperature during the heat controlling cycle.

A further object of the invention is to provide an automatically acting input power control device responsive to the expansion of the material of the heating unit itself.

Other objects and features of the invention will more fully appear from the following description and will be particularly pointed out in the claims.

To provide a better understanding of the invention a particular embodiment thereof will be described and illustrated in the accompanying drawings, wherein The single figure is a cross-sectional view of the device including a schematic electrical circuit for its operation.

The invention will be described in connection with a relatively small type of oven, such as that used to control the temperature of an oscillating quartz crystal thereby to prevent drift in frequency in a radio frequency power supply. It should be noted, however, that the principles of the invention are equally well adapted to larger units including units for a variety of applications requiring rigid temperature controls.

The specific device illustrated is provided with a container or oven 5 within which is received a quartz crystal oscillator 6 having lead wires 7 extending to the outside for connection to the radio frequency circuit whose frequency is controlled. Other devices than the oscillator may be placed in the oven 5. The inner sheath 8 of the oven may desirably be closely fitted to the oscillator, especially when the device is to be a unitary structure as in the case herein described. The walls comprising the sheath may be of any suitable material, such as glass, molded to form a sealed envelope. The sheath 8 is surrounded by a heating device 9 which may be of any electrically conductive material. Desirably, however, the heater is composed of a liquid metal, such as mercury, which is confined by an outer sheath 10 of any suitable material, such as glass. The inner sheath 8 desirably is positioned centrally within the outer sheath 10 and the space therebetween is filled with mercury. The thickness of the wall of mercury thus formed may be suited to a particular application of the invention, whether it be a high current or a low current device. In the specific device herein described the mercury may be confined to present a relatively thin wall completely inclosing the oven. Other metal than mercury may be used for a heating unit, particularly when the oven is to be operated at relatively higher temperatures. For example, Woods' metal could be used within a range of its melting temperature. In the same manner lead, tin or antimony could be used within their respective melting temperature ranges.

The sheath 10 is surrounded with insulation 11 preferably of high efficiency, such as the plastic foam variety. Such insulation may be provided in sufficient quantity to present a relatively thick layer surrounding and completely isolating the oven from ambient temperatures, such insulation serving also to prevent the escape of operating heat units.

To generate heat in the mercury, a coil 12 is provided having its turns situated outside of the insulation layer or the coil may be embedded in the insulation. Whatever this construction may be however, the coil should be spaced a substantial distance from the mercury heater and in position to surround the mercury with its electromagnetic field. By so remotely spacing the coil and heater, all or at least a substantial part of the insulation may be interposed between the mercury heater and the turns of the coil. By spacing the coil from the mercury heater and introducing the insulation therebetween, the coil and the heater become thermally isolated which prevents heat generated in the coil winding by reason of its ohmic resistance from being communicated to the heater, thus, the existence of such heat cannot cause temperature irregularities to appear in the temperature of the oven because, as will appear, the temperature sensing device for the apparatus is made responsive to the temperature of the heater 9 only.

Although the coil 12 is remote from the heater 9, energy in the coil is instantly converted to heat in the heater by reason of the induced molecular action which takes place uniformly throughout the whole body of the mercury. There can therefore be no lag in the application of heat directly to the oven and the heat is instantly distributed to every portion of the mercury completely and uniformly flooding the oven with heat. Moreover, when power is cut off in the coil 12, generation of heat instantly stops.

Any suitable means may be employed to achieve automatic operation of the device. A suitable method is illustrated in the drawing, wherein the outer container 10 is provided with a capillary tube 13 into which the mercury flows. The length of the column of mercury changes in proportion to the temperature of the mercury. This motion of the mercury column is utilized as a switching means to control current in the coil 11. To effect such operation a pair of electrical contacts 14 and 15 are sealed in the capillary tube in spaced relation, one of said contacts having constant contact with the mercury while the other contact acts as a switch to open and close a circuit connected to a suitable device for controlling the flow of energy in the coil 12. The contact 14 is so positioned that it will be engaged by the mercury column when the mercury attains the desired temperature.

Any suitable circuit arrangement may be provided. A desirable circuit is shown in the drawings wherein energy flowing to the coil 12 is controlled by a normally closed relay 16 placed in the circuit to an alternating current supply 17. A battery 18, or other source of energy, is connected in the control circuit of the relay. The contracts 14 and 15 are connected in series in the control circuit. To effect the required switching action, the contact 14 is so placed with respect to the top of the mercury column that when no energy is flowing in the coil 12, the column fails to make contact. When heat in the mercury moves the column into contact with the connection 14, the control circuit acts to open the relay contacts and cut off the flow of power to the coil 12. At this instant the mercury heater has reached the exact temperature required by the oven. When the temperature goes below this critical level the mercury column opens the control circuit which, in turn, closes the alternating current circuit to again supply heat. This cycle is repeated to maintain the desired temperature.

Other control devices may be used, as for example, if continuous control over a relatively wide range of temperatures is desired, the mercury column itself may serve as one element of a variable condenser, the other element being supplied by a metallic sleeve fitted to the outer surface of the capillary tube. In this case the variable capacity set up by the moving mercury column in response to changing temperature within the mercury functions through a suitable radio frequency sensitive circuit and power control means to vary the energy in the coil 11 in a predetermined manner.

The use of a capillary tube in the manner described provides an extremely accurate and fast acting control. In conventional temperature control systems the temperature sensing means has at least some degree of isolation from the heat source. This isolation introduces a time lag in the application of heat which, in turn, causes an overshoot in temperature in some control systems and causes hunting in other control systems. Such lack of smooth control is reflected in an overall uneven temperature in the oven.

The present invention eliminates these undesirable variations in temperature because the sensing element is itself the heat source and the heat source completely surrounds the controlled chamber or oven and, hence, the mercury instantly, and at all times, indicates the true average environmental temperature. Such temperature can be relied upon as the true temperature desired. For the reasons given, and also for the reason that when a liquid metal is used as the heat element, both conduction and convection function to insure even distribution of temperature throughout the body of the mercury or other liquid heater material.

What is claimed is:

1. Temperature controlling apparatus comprising an enclosed chamber to receive an object which is controlled, said chamber being bounded by an enclosed wall of heat conducting material, a heater composed of liquid metal surrounding said wall, a second wall of electrically non-conductive material acting to contain said liquid metal, a thick wall of electrically non-conductive heat insulating material surrounding said second wall, a multiturn coil having its turns positioned at such distance from said heater that substantially no heat will be transferred between said heater and coil by conduction or convection, a source of alternating current connected to said coil operable to heat said heat unit by electric induction, a capillary tube communicating with said heater and containing a column of liquid metal therefrom, said column acting as a temperature sensing means, electrical contacts at least one of which is contactable by movement of said column and another of said contacts connected to the body of liquid metal, and means actuated by the switching performed by said column to control the energy in said coil.

2. Temperature controlling apparatus according to claim 1 wherein the said coil is situated outside of the said layer of heat insulation.

References Cited in the file of this patent

UNITED STATES PATENTS

| | | |
|---|---|---|
| 1,921,432 | Stallard | Aug. 8, 1933 |
| 2,109,874 | Young et al. | Mar. 1, 1938 |
| 2,179,838 | Young | Nov. 14, 1939 |
| 2,524,886 | Colander et al. | Oct. 10, 1950 |
| 2,640,089 | Gilbert | May 26, 1953 |

OTHER REFERENCES

Industrial Heating, volume XXII, No. 7; July 1956; pp. 1460, 1462, 1464.